Patented June 17, 1924.

1,497,817

UNITED STATES PATENT OFFICE.

ALFRED A. WELLS, OF MONTCLAIR, NEW JERSEY, ASSIGNOR, BY MESNE ASSIGN-
MENTS, TO SETH B. HUNT, TRUSTEE, OF MOUNT KISCO, NEW YORK.

PROCESS OF MAKING ACETONE AND OTHER KETONES.

No Drawing.   Application filed August 13, 1918. Serial No. 249,627.

*To all whom it may concern:*

Be it known that I, ALFRED A. WELLS, a citizen of the United States, and a resident of Montclair, county of Essex, and State of New Jersey, have invented certain new and useful Improvements in Processes of Making Acetone and Other Ketones, of which the following is a specification.

This application is a continuation in part of my former application No. 235,249, filed May 18, 1918.

This invention relates to the process of making ketones from unsaturated hydrocarbons, such as olefines, contained in complex mixtures of saturated and unsaturated hydrocarbons, such as cracked gasolene, still gases or vapors of petroleum, shale oil or other mineral oils, and also from olefines obtained in various operations, such as the production of Pinch gas, Blau gas and the like, or regenerated olefines obtained in the sulfation process of making alcohols, or other olefine material may be employed. When products of comparatively low molecular weight, such as acetone, are desired, it is possible to utilize the still gases from petroleum which contain the vapors of unsaturated bodies. Gases and vapors obtained by cracking petroleum in stills or in tubes may be collected and used to furnish the raw material for carrying out the present invention, and various other forms of hydrocarbon material containing unsaturated hydrocarbons. In employing moist still gases it is preferable to dry same so that the extracting agent will not be diluted to a point where it will fail to absorb the unsaturated hydrocarbons efficiently.

The unsaturated hydrocarbons, or at least a substantial portion thereof, are extracted with an extracting agent which produces, with the unsaturated hydrocarbons, a reactive acid liquor which may be readily separated from residual liquid hydrocarbon material, when present. Sulfuric acid of about 1.7 to about 1.8 specific gravity gives good results as an extracting agent but other polybasic, (dibasic, tribasic, etc.) preferably mineral acids or mixtures thereof may sometimes be used, as mixtures of selenic acid or phosphoric acid with sulfuric acid and the like.

The production of ketones in accordance with the present invention is carried out by means of a catalyzing agent, and the ketones may be produced directly from the reactive acid liquor obtained in the manner just described, or in equivalent modes, but preferably the reactive acid liquor is hydrolyzed with about twice its volume of water and distilled, whereby alcohols are obtained having generally the same number of carbon atoms as are contained in the olefines from which produced, and I preferably make use of such alcohols, which are principally secondary alcohols, for the purpose of producing ketones therefrom, as in this manner clean alcoholic material is obtained and there is no admixture of any tars and polymerized bodies, as may be the case, to some extent, when reactive acid liquor is treated direct.

For the purpose of producing ketones for use as a solvent for materials such as acetyl cellulose, the lower ketones, such, for example, as acetone and methyl ethyl ketone, are well adapted for and serve as effective solvents for such material, and while the invention will be more particularly described with respect to the production of ketones of this general character, it is to be understood that the invention is not limited thereto but includes also the production of ketone bodies having a higher number of carbon atoms.

Reactive acid liquor adapted for the production of such lower boiling ketones may be advantageously produced from hydrocarbon material containing unsaturated hydrocarbons which can be handled in the gaseous or vaporous form at ordinary temperatures and pressures. Such material, as, for example, the gases and vapors of petroleum stills and the like, may be contacted with the extracting agent, as sulfuric acid of about the gravity referred to, in a number of ways, as, for example, the gases may be passed upward through a series of towers and brought into contact with the sulfuric acid in a counter-current manner, the acid trickling down through the towers over an extensive surface of finely divided refractory material, such as gravel, coke and the like, or the gases may be brought into contact with the sulfuric acid in churns, beaters or the like, with agitation. During the extraction a quantity of condensed oil is usually formed, and this oil or oil from other sources may be supplied and may serve substantially the purpose of an inert diluent material, retarding the passage of the gases and vapors and acting as an extending medium for the gases and vapors, whereby additional surface contact is obtained, or the hydrocarbon material taken for treatment may be in the liquid form, as, for example, the gases and vapors containing unsaturated hydrocarbons may be converted into liquid form by pressure and cold or by scrubbing in liquid oils or the like, in which case the acid is preferably added slowly with agitation and cooling, and the acid liquor after settling drawn off from the bottom.

While, as already stated, the acid extract or liquor may be oxidized direct for the production of ketones, I prefer to hydrolyze the same to alcohols and then to oxidize the alcohols to ketones.

According to the present invention air is preferably used as a source of oxygen for carrying on the operation of oxidation, though oxygen alone may be used, or air may have oxygen admixed therewith, or additional diluent gaseous or vaporous material may be used with air, as, for example, nitrogen or carbon dioxide or the like, or other products of combustion may be used as the neutral gaseous diluent for the air, or water vapor or steam may be admixed therewith and may serve to prevent the oxidation being carried too far and to limit the oxidation to the production of ketones. The alcohols may be converted into ketones by cracking at a high temperature, and in such case no oxygen need be supplied. When air is used for oxidizing, the escaping gases consist almost entirely of nitrogen with some quantities of carbon monoxide and carbon dioxide, and in accordance with one phase of the invention such escaping gases, which are substantially entirely of a non-reactive character, and are substantially impoverished of oxygen, may be used over and over in whole or part as a diluent material for the oxidizing agent. Preferably the quantity of oxygen supplied, whether in the form of air or in other form, is substantially that required for oxidation of the alcohols to ketones, and in order to limit the oxidation and prevent it going beyond the ketone stage, somewhat less than the amount of oxygen theoretically required for oxidation to the ketone stage, may be supplied, but in some cases an excess of air or oxygen may be used, as, for example, when it is desired to carry the oxidation, or a portion thereof, to a further extent, as for the production of organic acids and the like. The oxidizing agent and any inert gaseous diluent therefor may be supplied in any desired fashion, as, for example, by forcing it in under pressure or by applying suction to the condensers or scrubbers, or in other ways, and the operation may be carried on under pressure, at atmospheric pressure or at reduced pressure, as desired.

The alcohols are treated in the vaporous or gaseous state and may be vaporized in any desired manner, as, for example, they may be heated in a still and the air or other oxidizing agent introduced at or toward the bottom of the still and permitted to pass upwardly through the liquid body of alcohol, becoming charged with vapors of the alcohol, or the alcohol may be continuously supplied to a heated surface, as, for example, by applying in a slow stream into a heated pipe or the like, or various other ways of supplying the alcohol vapor may be resorted to, not all of which need necessarily involve the heating of the alcohol, as, for example, atomizing, carburetting, etc., may be resorted to.

The vapors of the alcohol, together with the oxidizing agent which may be accompanied by gaseous diluent material, such as nitrogen, steam and the like, are brought into contact with a catalyzing agent under conditions such that limited oxidation to ketones is accomplished, and the vapors of the ketones are condensed and recovered together with any unchanged alcohols and more or less organic acid which may be produced.

The character of the catalytic agent for effecting limited reaction between oxygen and the vapors of the alcohols is a matter of considerable importance. I have found that iron may be used to some extent as a catalyzer, and at least that the presence of iron is not harmful, so that the operation can readily be carried out with the use of iron or steel pipe or the like, which is readily available and inexpensive. If sulphur compounds are present in the material treated, however, it appears to be desirable to have the same removed before coming into contact with the catalyzer, as the presence of sulphur appears to have a poisoning effect on certain catalyzers, with a consequent falling off in yields of desirable material.

One material which gives good results when used as a catalyzer is copper. The copper may be in finely divided state, as, for example, turnings, lathe chips and the like may be used to form a catalyzer bed which, for example, may be arranged horizontally or vertically or in other ways. Heat is preferably applied to the catalyzer, as, for example, the same may be placed in a container such as a pipe, box or the like, which may itself be of copper, or, if more convenient, may be made of iron, and may be heated from the exterior. Where such a bed of catalyzer is utilized, the oxidation, especially toward the interior of the catalyzing agent, may be carried to an excessive extent, whereby, for example, the alcohols are oxidized entirely to gases, as carbon monoxide and carbon dioxide, and preferably a means of keeping the interior portion of such bed cool, or at least below excessively high temperatures, is provided, as, for example, a cooling coil may be provided for this purpose, or the catalyzer bed may be arranged around a central core through which cooling media, as air, may be passed or the like. The heating or cooling is preferably regulated in accordance with the temperature of the catalyzing chamber, and this may be done substantially automatically, as by means of thermostatic control or the like.

It has been found where the catalyzing agent is in a quite finely divided state, that such catalyzing agent is sometimes destroyed or burned through in places, and preferably the catalyzing material should have connected thereto or be formed as a part of a conducting metallic body, whereby the heat may be conducted away and excessive local rise of temperature, resulting in the destruction of the catalyzer, be avoided. The catalyzing agent, as copper, appears to become more effective upon use and should desirably be of a substantially spongy or porous character at the surface, as may be obtained or built up by a series of successive oxidations and reductions in use. When metallic copper is used, as in the form of tubes, wires, rods or the like, the surface thereof is soon brought into such state by use, and the same remains effective over fairly long periods, the local destruction of catalyzer being prevented by its being at the surface of a body of conducting metallic material. The metallic material need not be the same as the catalyzing material, as, for example, other metals having a surface coating of catalytic material, such as copper, may be used, as, for example, nickel, nichrome, Monel metal and the like having a coating of copper or other catalytic material may be used. Other catalytic materials may be used, as, for example, iron, silver, platinum, platinum-black, oxides of tin, chromium, cobalt, vanadium and the like, or mixtures of the foregoing.

After the vapors have been subjected to the action of the catalytic agent, which, for example, in the case of tubes or rods of copper, may be maintained at a temperature of about 700–900°F. for effective operation, the same are condensed. The heat taken up from such vapors in cooling may be utilized for supplying heat for the material, as alcohol, to be treated, as, for example, the alcohol, when supplied to the still or other vaporizing apparatus, may be preliminarily passed through the condenser jacket and the heat so obtained may be used for vaporizing or to assist in vaporizing the alcohols.

The outgoing gases from the condenser are preferably passed through a series of scrubbers, whereby all or substantially all vapors of ketones, alcohols and the like, are absorbed. The scrubbing or absorbent agent may be of various kinds, but inasmuch as water is produced in the ketone forming reaction, water is preferably used as a scrubbing or absorbent agent, at least in the first instance, though its absorbent action may be helped out by the use of adjunctive absorbing devices as baths or scrubbers, using oil and the like, or in place of scrubbers or other absorbing devices, the use of pressure with cold may be resorted to for liquefying the vaporous material produced, or the combined action of condensers, scrubbers and liquefaction devices, or one or more thereof, may be resorted to.

When the vapors are recovered by absorption, on distilling the condensate and the scrubbing material, as water or the like, the products of reaction, when the oxidation is limited substantially to the ketone stage, consist principally of ketones with more or less unconverted alcohols and with small traces of organic acids, and more or less carbon monoxide and carbon dioxide which, as already stated, with the nitrogen present may be admixed with the air or other oxidizing agent and used over and over in the process either in whole or in part. The use of such diluent gaseous material may serve to prevent the catalyzing agent from reaching too high a temperature and the oxidation from going beyond the stage productive of desirable materials, such as ketones, or, if desired, steam may be introduced with the vapors and may serve as a means of temperature control, keeping the temperature in the catalyzing chamber at a desired effective point.

The following examples are given for the purpose of affording an understanding of modes in which the invention can be carried out, and not for purposes of limitation:

Alcohols were prepared by extracting unsaturated hydrocarbons from still gases of petroleum by bringing same into contact with sulfuric acid of about 1.8 specific gravity, maintained at a temperature of about 20° C., and the acid extract was added to about twice its volume of water and distilled. A sample of such alcohols was substantially rectified by distillation, 94% of the sample boiling between 79–85° C. The alcohol was heated to about 65° C., and air was drawn through it at such a rate as to supply oxygen in slightly less than the quantity theoretically required to oxidize the alcohols to the ketone state, and the catalyzing chamber was filled with small copper tubes so arranged that the mixture of air and alcohol vapors traversed the tubes and spaces between them lengthwise. The temperature of the catalyzing chamber was maintained at about 800–900° F. The issuing vapors were passed through a condenser into a receiving vessel and the uncondensed portion scrubbed out in a series of scrubbers containing water.

The contents of the receiving vessels and scrubbers were found to contain acetone to the extent of about 75% of the alcohol taken for treatment. The issuing gases were analyzed from time to time to determine the amount of alcohol completely oxidized, which was found to vary from about 3% to about 10%, based on the quantity of alcohol used.

In another case irregular shaped pieces of iron in the form of ordinary jackstones were copper plated and placed in a copper tube, which was supported in a furnace and heated to about 800° F. A sample of the same alcoholic material, boiling principally between 79–85° C., with some portions of higher boiling alcohols, was heated to about 70° C. and air drawn through, using substantially the same condensing and scrubbing arrangement as before, and upon the third of three short runs, occupying not over an hour in all, and probably not affording time to build up the catalyzer surface to good efficiency, about 60% of alcohol was found to be converted into acetone.

With steel wool used as a catalyzing agent under circumstances similar, except for the catalyzer used, to those above described, and run at a temperature of about 750–800° F., a yield of acetone to the extent of about 55% of the quantity of alcohol used was obtained.

With platinum precipitated on asbestos as catalyzer, and run at a temperature of about 560–600° F., a conversion of about 45% of the alcohol into acetone was obtained.

With copper gauze made of fine copper wire and rolled into a fairly tight spiral and used as a spool or plug, placed in a catalyzing chamber and arranged with the axis of the spool parallel with the direction of vapor flow, the temperature being maintained at about 800–850° F., yields of acetone up to as high as 88% of the alcohol taken for treatment were obtained. After making a number of runs with this material used as a catalyzer, the copper gauze, which was constructed of very fine copper wire, was examined and found to be in poor condition, being practically burned through in places, thereby indicating that the very fine copper wire did not furnish a substantial body of metallic material to support the catalyzing surface formed thereon, and that the catalyzer should be formed of material having a sufficient, preferably metallic body to afford a substantial support for the substantially porous or spongy catalyzing surface formed thereon. Wire gauze made of fairly coarse wire may be used, if desired.

The alcohol from olefines of cracked petroleum used in the foregoing examples was principally iso-propyl alcohol and, being produced in the manner described with the presence of an excess of water during hydrolysis and rectification by distillation, is substantially completely water soluble and is accompanied more or less by hydrates of the alcohol, which must be allowed for in making determination of the acetone yield, and which affects the boiling point of the alcoholic material, generally lowering the same to some extent. From other alcohols and mixtures thereof, ketones corresponding to the alcoholic material used may be obtained and having largely the same number of carbon atoms as the alcoholic material, as, for example, from secondary butyl alcohols, methyl ethyl ketone may be obtained, and from mixtures of iso-propyl and iso-butyl alcohol with more or less traces of higher alcohols which may be present, mixtures of acetone and methyl ethyl ketone with perhaps some proportion of diethyl ketone may be obtained, etc.

I claim:

The process of making ketones from secondary alcohols, which comprises passing the vapors of such alcohols, together with gaseous material containing oxygen and steam, over a catalyzer having a catalytic surface and having a body of heat conductive material of sufficient heat conduction capacity to prevent overheating of the catalyzer surface by conduction of heat therefrom and serve as a support for the catalyzer while maintaining the heat of the catalyst at about 800–900° F.

In testimony that I claim the foregoing, I hereto set my hand, this 9th day of August, 1918.

ALFRED A. WELLS.